United States Patent
Naitoh et al.

(10) Patent No.: US 7,862,002 B2
(45) Date of Patent: Jan. 4, 2011

(54) VACUUM VALVE

(75) Inventors: Masahiro Naitoh, Kitanagoya (JP); Michinori Ikuji, Tajimi (JP); Shin Ito, Ichinomiya (JP); Makoto Iwata, Kasugai (JP)

(73) Assignee: CKD Corporation, Komaki-Shi (JP)

( * ) Notice: Subject to any disclaimer, the term of this patent is extended or adjusted under 35 U.S.C. 154(b) by 455 days.

(21) Appl. No.: 11/907,222

(22) Filed: Oct. 10, 2007

(65) Prior Publication Data

US 2008/0111095 A1  May 15, 2008

(30) Foreign Application Priority Data

Nov. 15, 2006 (JP) .............................. 2006-309277

(51) Int. Cl.
*F16K 31/00* (2006.01)
(52) U.S. Cl. .................. 251/63.6; 251/63.5; 251/335.3; 251/64
(58) Field of Classification Search .................... 251/62, 251/63.5, 63.6, 335.3, 64
See application file for complete search history.

(56) References Cited

U.S. PATENT DOCUMENTS

| | | | | |
|---|---|---|---|---|
| 3,923,282 | A | | 12/1975 | Henzler |
| 5,305,788 | A | * | 4/1994 | Mayeux ....................... 137/583 |
| 5,678,595 | A | * | 10/1997 | Iwabuchi ..................... 137/341 |
| 5,848,608 | A | * | 12/1998 | Ishigaki ................. 137/599.16 |
| 6,491,059 | B2 | | 12/2002 | Kajitani |
| 6,877,715 | B2 | * | 4/2005 | Kajitani ..................... 251/63.5 |
| 2002/0027211 | A1 | | 3/2002 | Kajitani |

FOREIGN PATENT DOCUMENTS

| | | |
|---|---|---|
| CN | 1341818 A | 3/2002 |
| JP | U-62-80078 | 5/1987 |
| JP | U-1-87306 | 6/1989 |
| JP | U-2-84078 | 6/1990 |
| JP | U-3-32258 | 3/1991 |
| JP | U-4-106576 | 9/1992 |
| JP | A-10-238512 | 9/1998 |
| JP | A-11-37329 | 2/1999 |
| JP | A-2000-227166 | 8/2000 |
| JP | A-2003-083467 | 3/2003 |
| JP | A-2005-076830 | 3/2005 |
| JP | A-2005-233298 | 9/2005 |
| JP | A-2006-170347 | 6/2006 |

\* cited by examiner

*Primary Examiner*—John K Fristoe, Jr.
(74) *Attorney, Agent, or Firm*—Oliff & Berridge PLC

(57) ABSTRACT

To provide a vacuum valve with an improved endurance of a bellows, a vacuum valve comprises: a valve section including a first port, a second port, a valve seat provided between the first and second ports, and a valve element movable into or out of contact with the valve seat; an actuator section including an orifice through which an operating fluid is supplied to the actuator section, and a piston coupled to the valve element, the piston being allowed to operate according to changes of pressure of the operating fluid to apply a driving force to the valve section; and a bellows which can be contracted and elongated as the valve element vertically moves upward and downward. The orifice is designed to have an effective sectional area determined so that an operating speed of the valve element and the piston is controlled to a predetermined speed for preventing damage of the bellows.

2 Claims, 17 Drawing Sheets

FROM CHAMBER

TO PUMP

VACUUM VALVE

BACKGROUND OF THE INVENTION

1. Field of the Invention

The present invention relates to a vacuum valve arranged to open and close while bellows is contracted and elongated.

2. Description of Related Art

Heretofore, for example, in a CVD device of a semiconductor manufacturing system, a material gas made of constituents for a thin-film material is supplied to a wafer in a reaction chamber, which is a vacuum container, through an inlet port thereof. Simultaneously, the reaction chamber is evacuated of the gas by a vacuum pump through an outlet port of the reaction chamber so that the reaction chamber is maintained under vacuum. A discharge speed of the material gas is controlled by for example a butterfly proportion valve. However, such butterfly proportion valve could not completely block a pipe. Accordingly, an ON/OFF vacuum valve is disposed in series with the butterfly proportion valve for completely interrupting the flow of a fluid in the pipe.

One example of the vacuum valve is disclosed in JP2003-83467A. This vacuum valve is shown as a sectional view in FIG. 15.

A vacuum valve 100 in FIG. 15 is operated to open and close by applying a driving force of an actuator section 102 to a valve section 101. In the actuator section 102, a piston 103 slidably installed in a cylinder 110 is coupled to one end of an output shaft 104 placed extending through a boss 111 of the cylinder 110. The output shaft 104 is thus guided axially. The other end of the output shaft 104 protrudes from the boss 111 into the valve section 101.

In the valve section 101, a valve element 105 is fixedly attached to the end of the output shaft 104 protruding in a valve body 112, and a valve seat 107 with which the valve element 105 is moved into or out of contact is provided between a first port 113 and a second port 114 of the valve body 112. The valve element 105 is always urged toward the valve seat 107 by a compression spring 115. A bellows 108 made of metal is placed in the valve body 112 in such a manner as to surround the compression spring 115 and the output shaft 104 and be elastically elongated and contracted.

The above vacuum valve 100 is operated in such a way that, when the piston chamber 109 is pressurized to move the piston 103 upward in the figure against the urging force of the compression spring 115, the valve element 105 is moved away from the valve seat 107, thereby allowing communication between the first port 113 and the second port 114.

When pressurizing of the piston chamber 109 is stopped, on the other hand, the piston 103 is moved downward by the urging force of the compression spring 115, thereby bringing the valve element 105 into contact with the valve seat 107 to completely close off fluid communication between the first port 113 and the second port 114.

While the above valve opening and closing operation is performed, the bellows 108 is contracted and elongated as the valve element 105 is moved and functions to hermetically separate the inside of the bellows 108 from the outside thereof. Accordingly, particles which may be generated in a sliding portion or the like of the output shaft 104 is unlikely to flow in the flow passage.

The conventional vacuum valve 100 however has disadvantages that the bellows 108 tends to be damaged or broken after long use, leading to leakage of the particles in the flow passage. Such damage of the bellows 108 has been regarded heretofore as being caused by impact or shock of the valve element 105 with the valve seat 107 at the time of valve closing.

The inventors of the present application repeatedly tested many bellows 108 for endurance and found that most of the bellows 108 were broken due to cracks caused at given portions. The inventors further found that the bellows 108 were cracked on impact caused when the valve element 105 struck against the boss 111 of the cylinder 110 at the time of valve opening, causing breakage of the bellows 108.

Consequently, the inventors have conceived the causes of the above defects as follows.

Specifically, the bellows 108 is held in a floating manner within the valve section 101 so as to be elastically contracted and elongated according to movements of the valve element 105. In this state, when the valve element 105 moves upward to a stroke end and strikes against the lower end of the boss 111, that impact is transmitted to the bellows 108 via the cylinder 110 and simultaneously transmitted to the bellows 108 from the valve element 105. Such two impacts transmitted to the bellows 108 act on the bellows 108 in opposite directions to cause the bellows 108 to vibrate in different directions. It is thus conceivable that the internal stresses of the bellows 108 induced by the vibration interfere with each other at a given portion, causing stress concentration on the interference portion. The stress concentration is caused in the same portion of the bellows 108 every time the valve element 105 strikes against a pipe member 106, and hence the given portion of the bellows 108 is damaged faster than other portions.

In view of the above causes, it is conceivably possible to enhance the endurance of the bellows 108 by controlling the "operating speed" of the valve element 105 when it starts a valve opening operation and the "impact acceleration" transmitted to the bellows 108 in a contracted state when the valve element 105 strikes against the boss 111. Thus, the inventors further performed life tests of the vacuum valve 100 by using different "operating speed" and "impact acceleration".

The life tests were executed on a plurality of vacuum valves having identical bellows and identical internal configurations by repeating a predetermined number of valve opening and closing operations of each vacuum valve and checking whether each valve reached a target number of operations corresponding to an expected useful life without damage of the bellows 108. The "operating speed" was measured by a speed sensor attached to the inner wall of the valve body 112. The "impact acceleration" was measured by an acceleration sensor attached to the valve element 105. Herein, the life tests were implemented on nineteen types of vacuum valves having different bellows and different internal configurations, in which each type includes a plurality of vacuum valves having identical bellows and identical internal configurations. The measurement results are shown in FIG. 16, in which some of the nineteen types of vacuum valves have the same results and hence nine marks represent the results of nineteen types of vacuum valves.

In FIG. 16, if a line is drawn between the long-life valves (determined in the life tests that the valves could reach the desired number of operations) and the short-life valves (determined in the life tests that the valves could not reach the desired number of operations), a hatched scope S in FIG. 16 is defined.

From the test results, as for the vacuum valves provided with the metal bellows, it is found that the bellows 108 were unlikely to be cracked in the case where the "operating speed" is 30 mm/s or more and 220 mm/s or less and the "impact acceleration" is in the hatched scope S in FIG. 16. If the operating speed exceeds 220 mm/s, increasing the impact acceleration accordingly, the bellows 108 is likely to be cracked. In this view, it is conceivable that the bellows 108 is unlikely to be cracked if the operating speed is reduced, decreasing the impact acceleration. In fact, however, even where the operating speed was lower than 30 mm/s and the impact acceleration was low, the bellows 108 was cracked as indicated in FIG. 16.

From the above test results, the inventors found that the bellows 108 of the vacuum valves 100 having the same stroke were decreased in endurance in both cases where the operating speed was too low and too high. Further, the inventors found that the endurance of the bellows 108 could be increased when the impact accelerator speed could be reduced even when the operating speed was high. Accordingly, if only the vacuum valve 100 is designed to increase the operating speed while reducing the impact acceleration, it is possible to lengthen the useful life of the bellows 108 to improve the endurance of the vacuum valve 100.

Some vacuum valves are arranged to allow the piston to abut against the inner wall of the piston chamber. As for this type of vacuum valve, similarly, the inventors also found from the endurance tests that the bellows 108 was cracked and broken as in the above case. Consequently, this type of vacuum valve has only to be designed to achieve a higher operating speed and a lower impact acceleration in order to increase the life of the bellows 108 and hence improve the endurance of the vacuum valve 100.

SUMMARY OF THE INVENTION

The present invention has been made to achieve the above object and has an object to provide a vacuum valve with bellows having an improved endurance.

To achieve the purpose of the invention, there is provided a vacuum valve comprising: a valve section including a first port, a second port, a valve seat provided between the first and second ports, and a valve element movable into or out of contact with the valve seat; an actuator section including an orifice through which an operating fluid is supplied to the actuator section, and a piston coupled to the valve element, the piston being allowed to operate according to changes of pressure of the operating fluid to apply a driving force to the valve section; and a bellows which can be contracted and elongated as the valve element vertically moves upward and downward, wherein the orifice is designed to have an effective sectional area determined so that an operating speed of the valve element and the piston is controlled to a predetermined speed for preventing damage of the bellows.

According to another aspect, the present invention provides a vacuum valve comprising: a valve main unit including a first port, a second port, and a valve seat provided between the first and second ports; a valve element movable into or out of contact with the valve seat, the valve element being arranged to abut against the valve main unit when the valve element is moved to a full open position; an actuator section including an output shaft connected to the valve element for applying a driving force to the valve element through the output shaft; a bellows placed surrounding the output shaft in the valve main unit in such a manner as to be elastically contracted and elongated; and a cushioning member adapted to mitigate impact caused when the valve element is moved into contact with the valve main unit and also reduce impact acceleration of the valve element when it is moved into contact with the valve main unit to prevent damage of the bellows.

Further, according to another aspect, the present invention provides a vacuum valve comprising: a valve main unit including a first port, a second port, and a valve seat provided between the first and second ports; a valve element movable into or out of contact with the valve seat; an actuator section including a piston chamber, a piston slidably installed in the piston chamber, and an output shaft integrally connected to the piston and coupled to the valve element respectively, the piston being allowed to operate according to changes of pressure to be applied to the piston to apply a driving force to the valve element; a bellows placed surrounding the output shaft in the valve main unit in such a manner as to be elastically contracted and elongated; and a cushioning mechanism adapted to mitigate impact caused when one of the piston and the output shaft axially is moved into contact with an inner wall of the piston chamber and also reduce impact acceleration when the one of the piston and the output shaft is moved into contact with the inner wall of the piston chamber to prevent damage of the bellows.

BRIEF DESCRIPTION OF THE DRAWINGS

FIG. 13A1 is a sectional view of a vacuum valve of a fourth embodiment according to the present invention, showing a valve closed state;

DETAILED DESCRIPTION OF THE PREFERRED EMBODIMENTS

Preferred embodiments of a vacuum valve embodying the present invention will be described below referring to accompanying drawings.

First Embodiment

Figure 1:
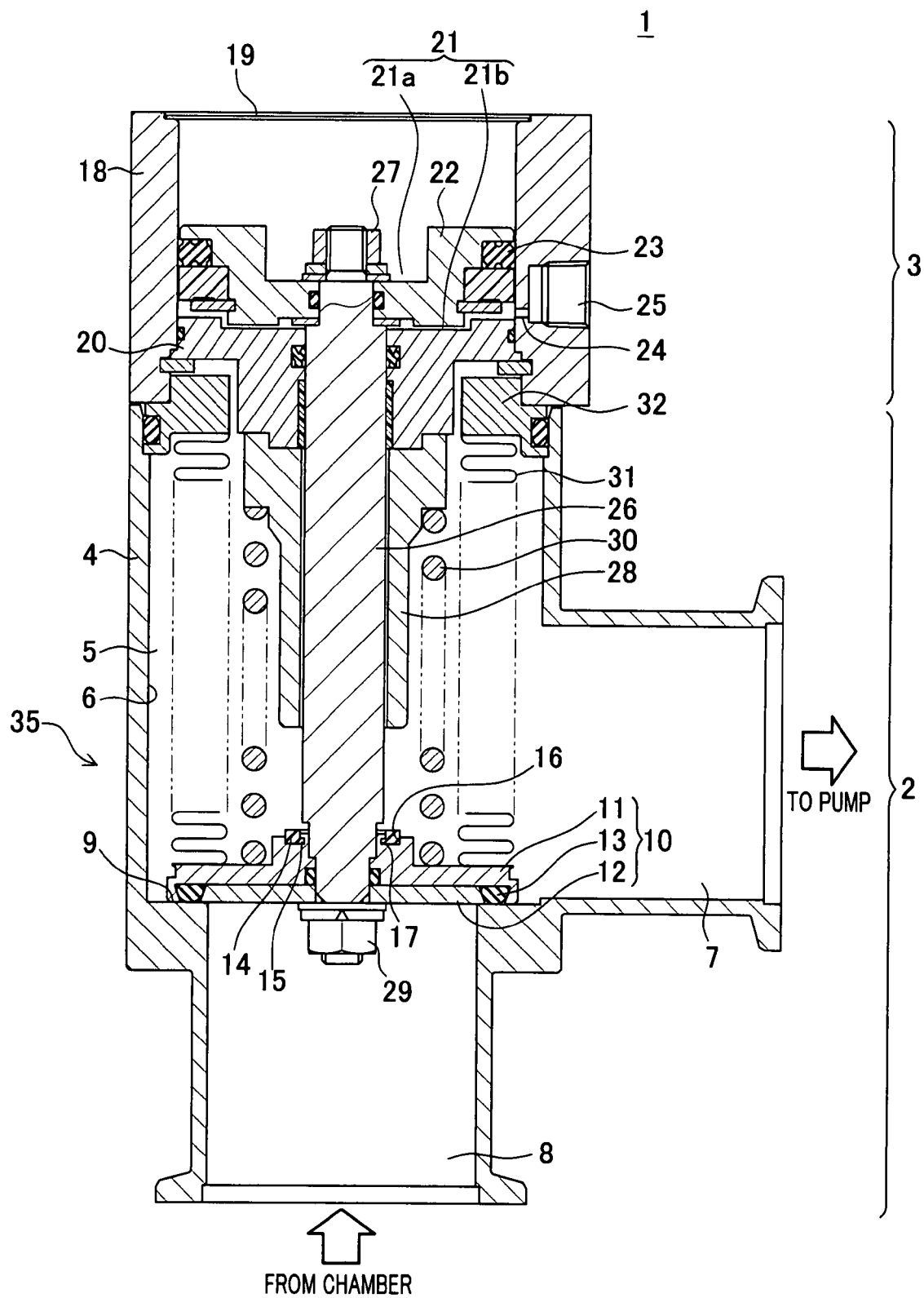
FIG. 1 is a sectional view of a vacuum valve of a first embodiment according to the present invention, showing a valve closed state.
Figure 2A:
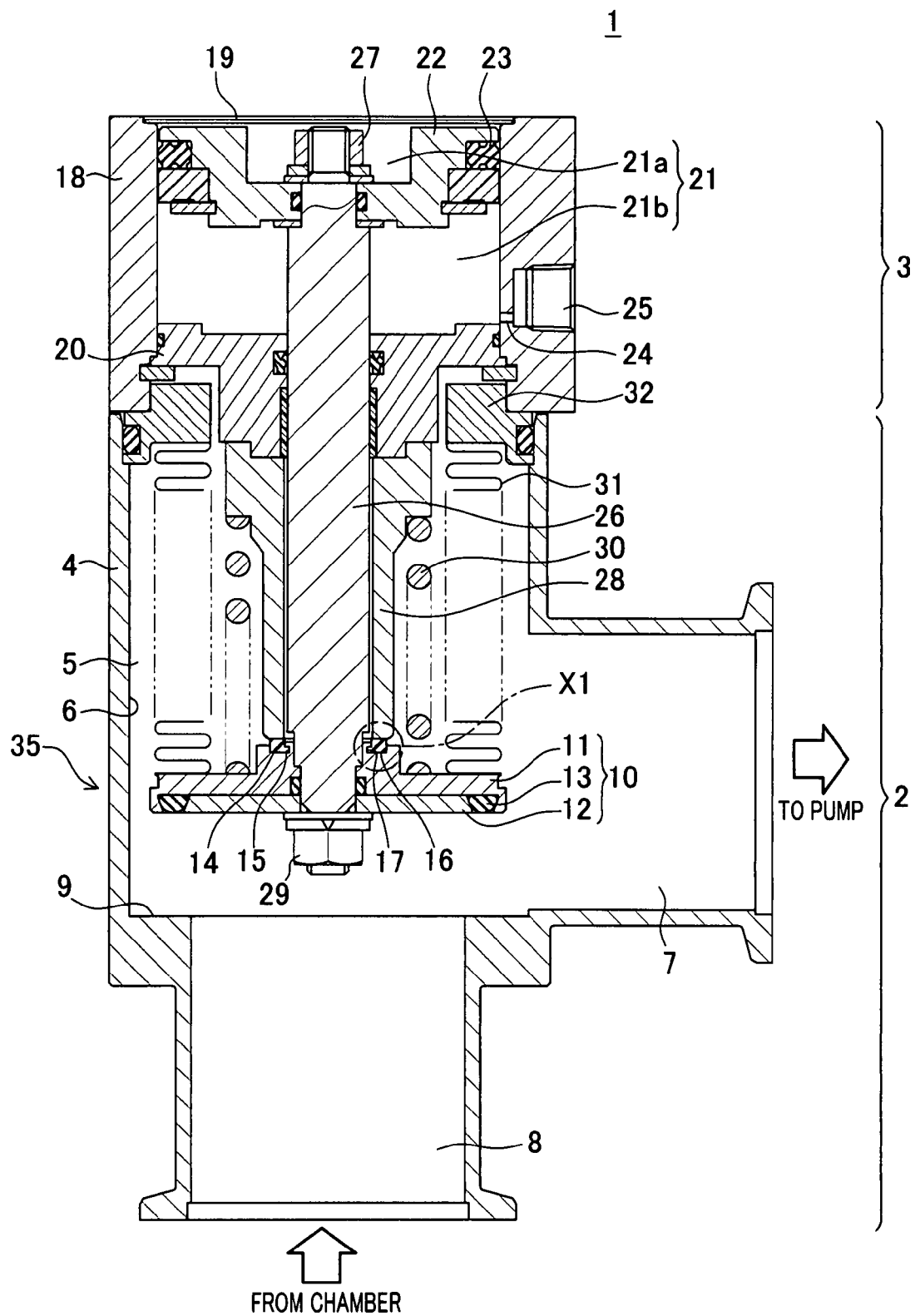
FIG. 2A is a sectional view of the vacuum valve of the first embodiment, showing a valve open state.
Figure 2B:
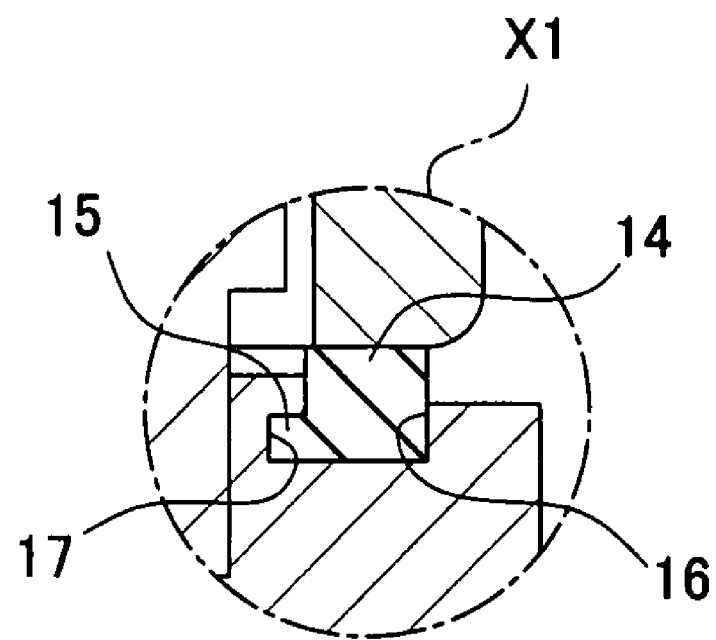
FIG. 2B is an enlarged view of a part X1 in FIG. 2A.

FIG. 1 is a sectional view of a vacuum valve 1 of a first embodiment, showing a valve closed state. FIG. 2A is a sectional view of the vacuum valve 1 of the first embodiment, showing a valve open state. FIG. 2B is an enlarged view of a part X1 in FIG. 2A.

The vacuum valve 1 shown in FIGS. 1 and 2A can be installed together with a butterfly proportion valve between a reaction chamber and a vacuum pump in a semiconductor manufacturing system in a similar manner as a conventional one. The vacuum valve 1 is an ON/OFF shutoff valve arranged to open and close while a bellows 31 is contracted and elongated, thereby controlling opening and shutoff of a pipe through which gas is discharged from the reaction chamber. Specifically, the vacuum valve 1 is operated to open and close by applying a driving force of an actuator section 3 to a valve section 2.

The valve section 2 is built in a valve main unit 35 formed with a valve chamber 5 including a valve seat 9 between a first port 7 and a second port 8. In the present embodiment, the main unit 35 includes a valve body 4, a second closing plate 20, and a pipe member 28. The valve body 4 is made of a metal material such as stainless steel and carbon steel for ensuring rigidity and resistance to pressure. The valve body 4 is formed with a cavity 6 serving as a valve chamber 5 closed by the second closing plate 20. The cavity 6 communicates with the first port 7 opening in the side surface of the valve body 4 and with the second port 8 opening in the lower surface of the valve body 4 in the figure. The valve body 4 is formed with the valve seat 9 formed of a flat surface around an aperture of the second port 8 opening in the cavity 6. A valve element 10 can be brought into and out of contact with the valve seat 9.

The valve element 10 includes a fixed plate 11, a support plate 12, and an O-ring 13 fitted between the fixed plate 11 and the support plate 12. The fixed plate 11 and the support plate 12 are made of metal such as stainless steel and carbon steel for ensuring rigidity. The O-ring 13 is made of an elastic material such as rubber for allowing close contact with the valve seat 9 and exerting a sealing force against the valve seat 9. When the valve element 10 is moved upward, it abuts against the lower end of the pipe member 28. Thus, upward movement of the valve element 10 is restricted by the lower end of the pipe member 28. For cushioning the impact of the valve element 10 when abuts against the pipe member 28, a cushioning member 14 is mounted in the upper surface of the fixed plate 11 in such a manner as to face the lower end of the pipe member 28.

The cushioning member 14 is located with its end protruding from the upper surface of the fixed plate 11 to hold the valve element 10 with a slight clearance from the pipe member 28 while the valve is fully open as shown in FIGS. 2A and 2B. The cushioning member 14 is made of an elastic material such as high-hardness rubber and resin. In the present embodiment, the cushioning member 14 is made of urethane rubber having a hardness of 90 degree.

Figure 3:
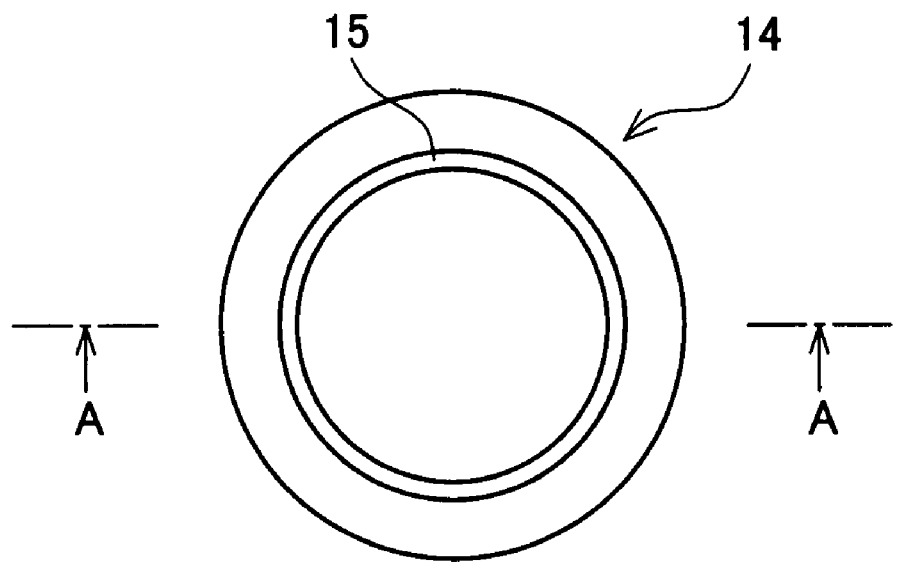
FIG. 3 is a plan view of a cushioning member shown in FIG. 1.
Figure 4:
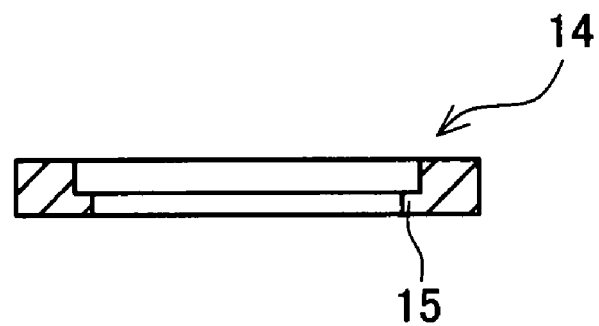
FIG. 4 is a sectional view of the cushioning member taken along a line A-A in FIG. 3.

FIG. 3 is a plan view of the cushioning member 14 of FIG. 1. FIG. 4 is a sectional view of the cushioning member 14 taken along a line A-A in FIG. 3.

The cushioning member 14 is of an annular shape and almost rectangular in section, which is formed with an annular protrusion 15 radially inwardly protruding from the inner circumferential surface of the cushioning member 14.

As shown in FIGS. 1, 2A, and 2B, the fixed plate 11 is formed with an annular groove 16 in the upper surface in which the cushioning member 14 is fitted. Specifically, the groove 16 includes an engagement recess 17 on the radially inward side relative to the opening of the groove 16 so that the annular protrusion 15 of the cushioning member 14 is engaged in the recess 17.

The cushioning member 14 is attached to the fixed plate 11 in such a way that the cushioning member 14 is pressed into the groove 16 while the protrusion 15 is elastically deformed until the protrusion 15 enters the recess 17 and returns to the original form into engagement with the recess 17. The engagement between the protrusion 15 and the recess 17 can prevent the cushioning member 14 from dropping off the fixed plate 11 even where the valve element 10 vibrates while the vacuum valve 1 is operated to open and close.

On the other hand, the actuator section 3 is built in a cylinder body 18 connected to the valve body 4. The cylinder body 18 is made of metal such as stainless steel and carbon steel for ensuring resistance to pressure. The cylinder body 18 is of a cylindrical shape having upper and lower openings. The upper opening of the cylinder body 18 is closed with a first closing plate 19, while the lower opening is closed with the second closing plate 20, thereby forming a piston chamber 21.

The piston chamber 21 is partitioned into a first chamber 21a and a second chamber 21b by a piston 22 slidably installed in the cylinder body 18. The piston 22 is made of metal for ensuring resistance to pressure and rigidity. A seal member 23 made of an elastic material such as rubber and resin is fitted around the outer periphery of the piston 22. Accordingly, the piston chamber 21 is hermetically divided into the first chamber 21a and the second chamber 21b by the piston 22. The first chamber 21a is communicated with atmosphere through an opening not shown open to the atmosphere. The second chamber 21b is communicated with an operation port 25 through an orifice 24 formed in the cylinder body 18. In the present embodiment, the orifice 24 has a circular section in a direction perpendicular to FIG. 1, that is, the orifice 24 has a circular opening open into the operation port 25.

An output shaft 26 made of metal is fixed to the piston 22 in such a way that the shaft 26 is inserted from below through the center of the piston 22. Specifically, this output shaft 26 is integrally fixed to the piston 22 with a metal fixing nut 27 threadedly engaged on an upper end of the output shaft 26 protruding from the piton 22. In the present embodiment, the nut 27 constitutes a part of the output shaft 26. The output shaft 26 is also slidably inserted through the second closing plate 20 and the pipe member 28 so that a distal end portion of the output shaft 26 protrudes into the valve chamber 5.

The pipe member 28 is located with its lower end positioned in the valve chamber 5 to define the full open position of the valve element 10. A distal end of the output shaft 26 is inserted through the center of the valve element 10 and integrally fixed to the valve element 10 with a mounting nut 29 threadedly engaged on the distal end of the output shaft 26. The output shaft 26 is allowed to come in or out of the lower end of the pipe member 28. The piston 22 and the valve element 10 are thus integrally connected to each other through the output shaft 26 and therefore can be vertically moved upward and downward together.

A return spring 30 is installed in a compressed form between the valve element 10 and the pipe member 28 to urge the valve element 10 downward toward the valve seat 9. This urging force causes the valve element 10 to bear on the valve seat 9 while pressing the O-ring 13 to be deformed, thereby exerting a sealing force against the valve seat 9. The spring force or elastic force of the return spring 30 is transmitted from the valve element 10 to the piston 22 through the output shaft 26, imparting a downward force to the piton 22 in the figure.

The output shaft 26, the pipe member 28, and the return spring 30 are surrounded by the bellows 31 to prevent particles occurring in sliding portions or the like of the output shaft 26 and the pipe member 28 from leaking into the valve chamber 5. The bellows 31 is made of metal such as stainless steel and placed in the valve chamber 5 in such a manner as to be elastically elongated and contracted. An upper end of the bellows 31 is welded to an annular holder 32 part of which is engaged between the valve body 4 and the cylinder body 18. Thus, the holder 32 is positioned in place relative to the valve body 4 and the cylinder body 18. A lower end of the bellows 31 is welded to the fixed plate 11, outside the return spring 30.

The vacuum valve 1 having the above configuration can be connected, for example, to a vacuum pump through the first port 7 and to a vacuum container through the second port 8. The operation port 25 can be connected to an operating fluid control device not shown.

While no operating fluid is supplied to the vacuum valve 1 through the operation port 25, the valve element 10 is held in contact with the valve seat 9 by the elastic force of the return spring 30 as shown in FIG. 1, interrupting communication between the first port 7 and the second port 8. Accordingly, any fluid is not allowed to flow from the second port 8 to the first port 7, and the vacuum container is not evacuated.

When an operating fluid is supplied to the operation port 25, the internal pressure of the second chamber 21b is increased to move the piston 22 upward against the elastic force of the return spring 30, thereby moving the valve element 10 away from the valve seat 9 up to the full open position as shown in FIG. 2A. Accordingly, the first port 7 and the second port 8 are brought into communication with each other, allowing the flow of a fluid from the second port 8 to the first port 7. The vacuum container is thus evacuated by operation of the vacuum pump.

After that, when the operating fluid is discharged from the second chamber 21b, the internal pressure of the second chamber 21b is decreased. The valve element 10 is then moved down by the elastic force of the return spring 30 and then bears on the valve seat 9 as shown in FIG. 1. Consequently, communication between the first port 7 and the second port 8 is interrupted again, blocking the flow of a fluid. Thus, the vacuum container is not evacuated again.

Meanwhile, as mentioned in the BACKGROUND OF THE INVENTION, the inventors found that the useful life of the bellows could be increased to improve endurance of the vacuum valve by designing the vacuum valve so as to increase the operating speed while reducing the impact acceleration. The inventors took notice of that adjustment of an effective sectional area of the orifice 24 was effective in controlling the operating speed of the valve element 10 to an appropriate value and controlling the impact acceleration of the valve element 10 when abutting against the pipe member 28 through the cushioning member 14. Concrete examples thereof are explained below.

Figure 5:
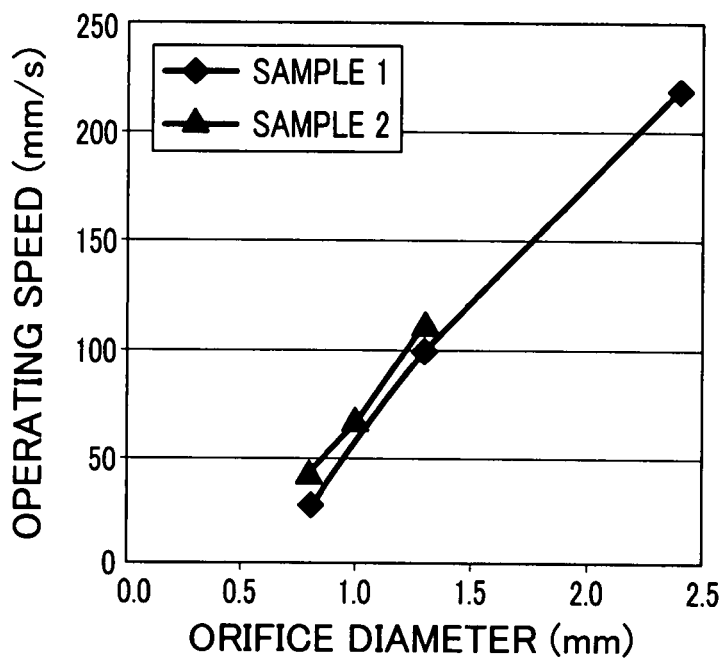
FIG. 5 is a graph showing a relation between orifice diameter and operating speed, the vertical axis indicating the operating speed (mm/s) and the horizontal axis indicating the orifice diameter (mm)
Figure 16:
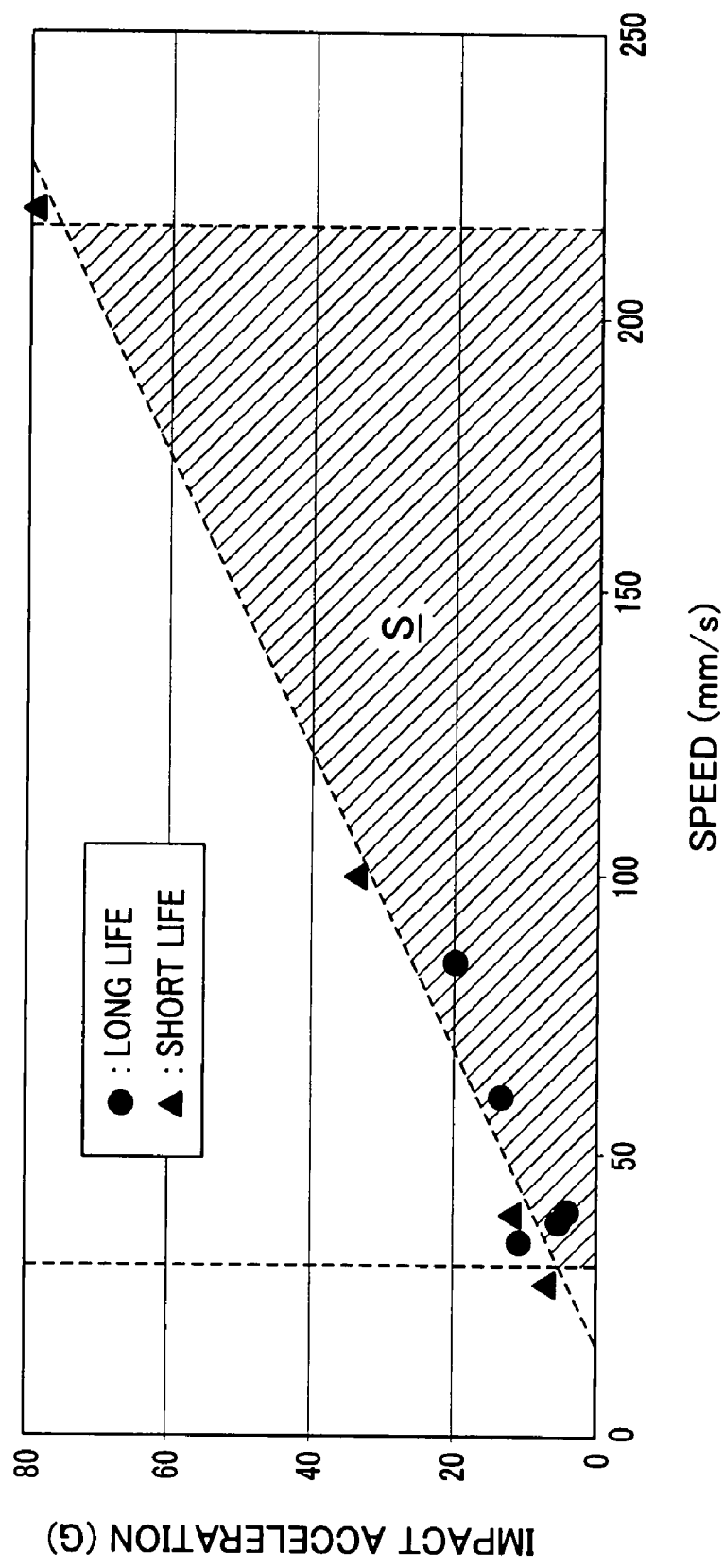
FIG. 16 is a graph showing life test results.

For example, as shown in FIG. 16, when the operating speed is set in a range of 30 mm/s to 220 mm/s, the life of the bellows can be increased. Accordingly, the inventors examined the relation between the diameter of the orifice 24 circular in section and the operating speed by using two kinds of samples (Sample 1 and Sample 2) of the vacuum valves having identical bellows and different internal configurations. Examined results thereof are shown in FIG. 5.

For example, the vacuum valves of Sample 1 include three different orifice diameters. As shown in FIG. 5, the vacuum valve with an orifice diameter of 0.8 mm could control the operating speed to about 28 mm/s, the vacuum valve with an orifice diameter of 1.3 mm could control the operating speed to about 100 mm/s, and the vacuum valve with an orifice diameter of 2.4 mm could control the operating speed to about 220 mm/s.

Similarly, the vacuum valves of Sample 2 include three different orifice diameters. The vacuum valve with an orifice diameter of 0.8 mm could control the operating speed to about 43 mm/s, the vacuum valve with an orifice diameter of 1.0 mm could control the operating speed to about 68 mm/s, and the vacuum valve with an orifice diameter of 1.3 mm could control the operating speed to about 112 mm/s.

The above results show that each of the vacuum valves of Samples 1 and 2 having the different internal configurations has a positive correlation between the orifice diameter and the operating speed. Accordingly, it is found that the vacuum valves, even different in internal configuration, could achieve any operating speed depending on the orifice diameter, namely, the effective sectional area of the orifice 24.

Figure 6:
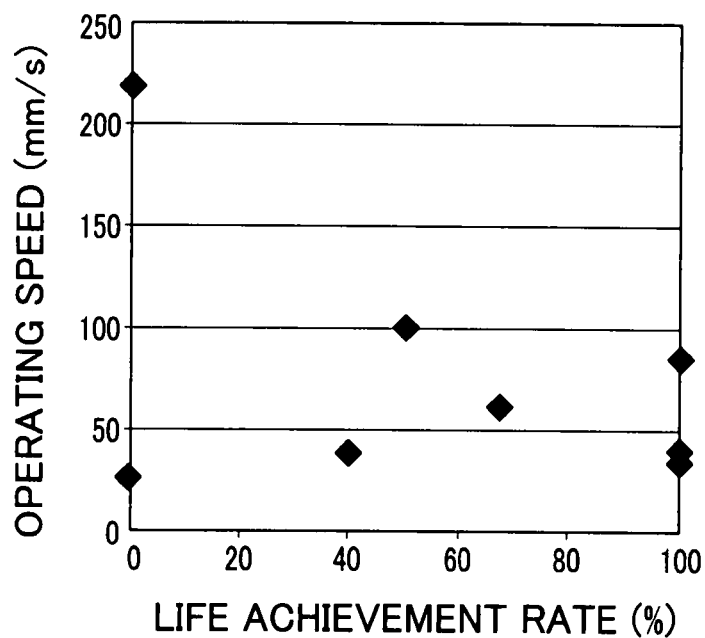
FIG. 6 is a graph showing a relation between bellows useful life and operating speed, the vertical axis indicating the operating speed (mm/s) and the horizontal axis indicating an achievement rate of expected useful life (%)

Further, the inventors executed a life test for examining the influence of the operating speed on the life of the bellows 31. This life test was performed in a similar manner to that described in the BACKGROUND OF THE INVENTION. Specifically, the life test was performed by repeating a predetermined number of valve opening and closing operations of each of the vacuum valves having identical bellows and identical internal configurations and checking whether each vacuum valve has reached "the target number of operations corresponding to an expected useful life" (herein, referred to as "target useful life") without damage of the bellows 31. Herein, the life test was made by using several groups of vacuum valves, different in bellows and internal configurations from group to group (that is, the vacuum valves of the same group have identical bellows and internal configurations), and setting the operating speed different from group to group to examine an achievement rate of an expected useful life (herein, referred to as a "life achievement rate"), i.e., a percentage of the bellows that have reached the target useful life in each group. Test results thereof are shown in FIG. 6.

For example, when the operating speed is 220 mm/s or more, the life achievement rate is as low as 0%. This conceivably results from that, when the valve element 10 operates in a short stroke and at a high operating speed, the valve element 10 accelerated tends to rapidly abut against the pipe member 28, so that resultant strong impact is transmitted to the bellows 31, cracking or damaging the bellows 31.

However, there is a case where the life achievement rate is as low as 0% even when the operating speed is as low as below 30 mm/s. Since it is generally assumed that the impact acceleration becomes lower as the operating speed is lower, it is uncertain why the life achievement rate is also low even if the operating speed is too low.

Even where the operating speed is as low as around 40 mm/s, on the other hand, the life achievement rate is different depending on the different internal configurations.

The above test results revealed that it was necessary to determine the effective sectional area in the vacuum valve in well balanced manner relative to the internal configuration and the operating conditions of the vacuum valve such as a piston diameter of the vacuum valve and operation pressure to be applied to the vacuum valve so that a high life achievement rate is obtained.

For realizing good response, the effective sectional area is preferably determined to accomplish a high operating speed in a range where the high life achievement rate is obtained.

The effective sectional area can be determined as follows.

The operating speed V is first determined by an expression I:

$$V = L/T \qquad (I)$$

where V indicates an operating speed of a valve element (piston), L indicates an operation stroke of the valve element (piston), and t indicates an operation time of the valve element (piston).

The operation time t for which the operating speed V reaches a predetermined operating speed range (an operating speed range effective in achieving 100% of the life achievement rate; e.g., 30 mm/s to 220 mm/s in FIG. 16) is calculated by the expression I.

In general, the operation time t can be calculated by summing a time t1 required for the valve element 10 to start moving, a time t2 during which the valve element 10 is accelerated, and a time t3 during which the valve element 10 is moved at a constant speed. In the vacuum valve 1, however, the valve element 10 is operated in a short stroke (e.g., 15 mm) and thus the operation time t can be regarded as the time t2 for acceleration of the valve element 10. This time t2 for acceleration of the valve element 10 can be determined by the following expression II.

$$t2 = 0.005536 \times \frac{\left[\frac{M}{P_0}\right]^{0.415}}{A_1^{0.245}\left[1 - \frac{F+f}{A_1 P_0}\right]} \times \frac{L^{0.585}}{S_2^{0.17}} \qquad (II)$$

In the expression II, F indicates a load (N), f indicates a frictional force (N) of the cylinder body 18, $A_1$ indicates a pressure-receiving area (mm²) of part of the piston 22 on a fluid supply side, $P_0$ indicates pressure (MPa) of an operating fluid to be supplied to the operation port 25, M indicates the mass (kg) of the load, L indicates a distance (mm) of operation stroke of the valve element 10, and $S_2$ indicates an effective sectional area of the orifice 24 on the side of the operation port 25.

By applying the operation time t determined by the expression I to the time t2 for acceleration of the valve element 10 in the above expression II and substituting design values of the vacuum valve 1 into the above parameters in the expression II; i.e., load F (N), frictional force f (N), pressure-receiving area $A_1$ (mm²), fluid supply pressure $P_0$ (MPa), mass M (kg) of the load, and operation stroke L (mm), the effective sectional area of the orifice 24 opening in the operation port 25 can be calculated.

The vacuum valve 1 of the first embodiment shown in FIGS. 1 and 2A is designed so that the diameter of the orifice 24 is 1.8 mm under conditions that the load F is 3.0 N, the frictional force N of the cylinder body 18 is 50 N to 70 N, a piston diameter on the fluid supply side is 50 mm (the piston pressure-receiving area $A_1$ on the fluid supply side is 2500 πmm²), and the fluid supply pressure $P_0$ (the pressure of an operating fluid to be supplied to the operation port 25) is 0.4 MPa to 0.6 MPa, the mass M of the load is 0.3 kg and the operation stroke L of the valve element 10 is 15 mm.

On the other hand, in the case where the operating speed is in a range of 30 mm/s to 220 mm/s as shown in FIG. 16 and the impact acceleration is determined in the hatched scope S, the life of the bellows can be increased. The inventors accordingly examined a relation between the presence/absence of the cushioning member 14 and the impact acceleration by using two kinds of samples (Sample 3 and Sample 4) of the vacuum valves having identical bellows and different internal configurations. Examined results thereof are shown in FIG. 7.

Figure 7:
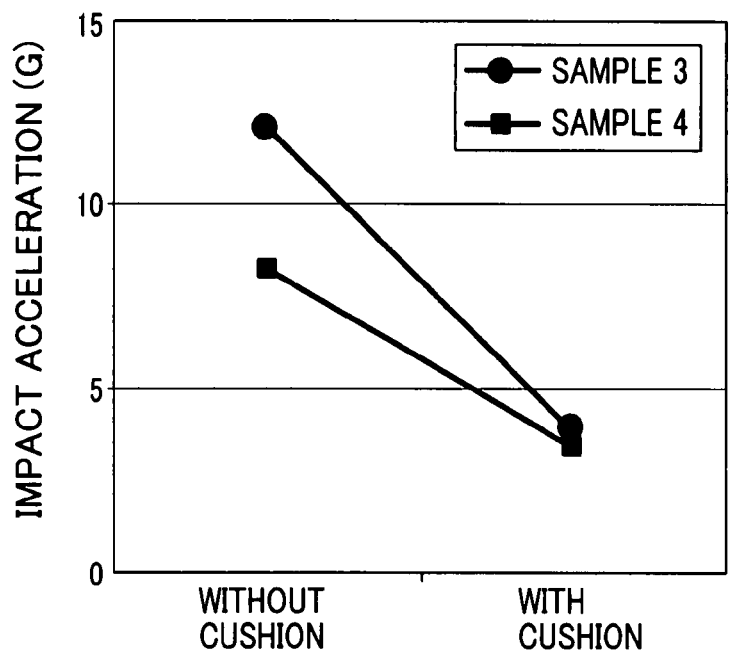
FIG. 7 is a graph showing a relation between the presence/absence of a cushion and impact acceleration, the vertical axis indicating impact acceleration (G) and the horizontal axis indicating the presence/absence of the cushion.

As shown in FIG. 7, the impact acceleration in the vacuum valve of Sample 3 without cushioning member 14 was about 12G and the impact acceleration in the vacuum valve of Sample 3 with the cushioning member 14 was about 4 G. As for Sample 3, consequently, the impact acceleration in the vacuum valve with the cushioning member 14 could be reduced to about 33% of that in the vacuum valve without cushioning member 14.

The impact acceleration in the vacuum valve of Sample 4 without cushioning member 14 was about 8 G and the impact acceleration in the vacuum valve of Sample 4 with the cushioning member 14 was about 3.4 G. As for Sample 4, consequently, the impact acceleration in the vacuum valve with the cushioning member 14 could be reduced to about 42% of that in the vacuum valve without cushioning member 14.

Moreover, the inventors implemented the life test to examine the influence of the impact acceleration on the life of the bellows 31. The life test was performed in a similar manner to that disclosed in BACKGROUND OF THE ART. Specifically, the life test was conducted by repeating a predetermined number of valve opening and closing operations of each of the vacuum valves having identical bellows and identical internal configurations and checking whether each vacuum valve has reached a target number of operations corresponding to an expected useful life ("target useful life") without damaging the bellows 31. Herein, the life test was made by using several groups of the vacuum valves different in bellows and internal configurations from group to group and setting the operating speed different from group to group to examine an achievement rate of an expected useful life ("life achievement rate"), i.e., a percentage of the bellows that have reached the target useful life in each group. Test results are shown in FIG. 8.

Figure 8:
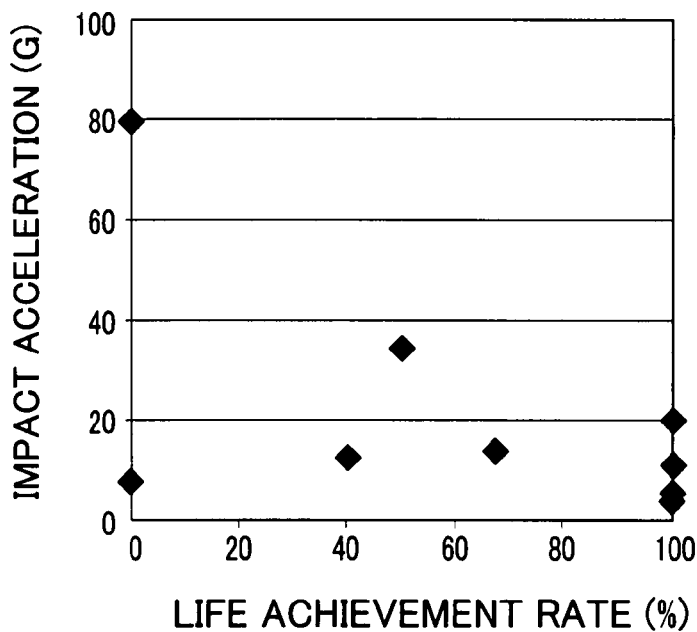
FIG. 8 is a graph showing a relation between the useful life of the bellows and the impact acceleration of a valve element, the vertical axis indicating the impact acceleration (G) and the horizontal axis indicating the an achievement rate of expected useful life (%)

As shown in FIG. 8, when the impact acceleration was about 80 G, the life achievement rate was 0%. This is conceivably because the impact caused when the valve element 10 abuts against the pipe member 28 is so large as to cause large stress in the bellows 31.

However, there is a case where the life achievement rate is 0% even if the impact acceleration is about 8 G. Since it is generally assumed that the internal stress of the bellows 31 becomes smaller as the impact acceleration is smaller, it is uncertain why the life of the bellows 31 is short even though the impact acceleration is low.

Further, the life achievement rate is different between vacuum valves depending on the internal configurations even when the impact acceleration is about equal.

When the cushioning member 14 is attached to the vacuum valve for reducing the impact acceleration, accordingly, it is necessary to select the property of the cushioning member 14 such as hardness and material in consideration of balance relative to the internal configuration and the operating conditions of the concerned vacuum valve such as the piston diameter and the operation pressure so that a high life achievement rate can be obtained. To prevent damage of the bellows 31, it is preferable to select the cushioning member 14 whereby the impact acceleration can be minimized.

According to the vacuum valve 1 of the first embodiment, the operating speed of the valve element 10 and the piston 22 is controlled by the effective sectional area (orifice diameter) of the orifice 24 through which the operating fluid is supplied to the piston chamber 21, preventing damage of the bellows 31. This makes it possible to increase the useful life of the bellows 31, thus improving the endurance of the vacuum valve 1.

According to the vacuum valve 1 of the first embodiment, the impact acceleration of the valve element 10 when abutting against the pipe member 28 forming a part of the valve main unit 35 can be mitigated by the cushioning member 14, preventing the bellows 31 from becoming damaged. The life of the bellows 31 can therefore be increased with the result that the endurance of the vacuum valve 1 can be improved.

In the vacuum valve 1 of the first embodiment, particularly, the above advantage of the orifice 24 and the advantage of the cushioning member 14 act synergistically. It is therefore possible to reduce the impact acceleration while increasing the operating speed, thus increasing the life of the bellows 31 while keeping good response.

Second Embodiment

Figure 9A:
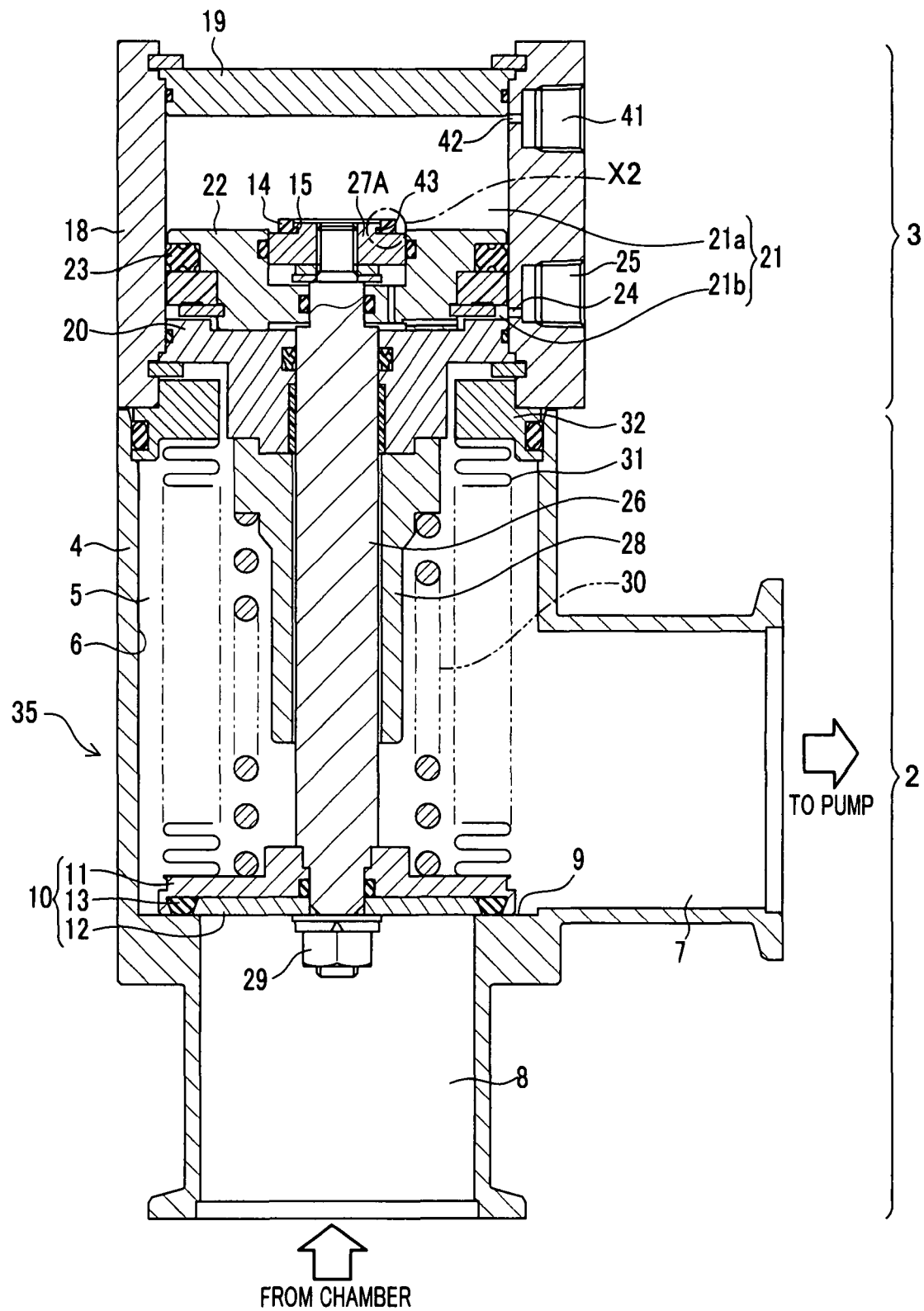
FIG. 9A is a sectional view of a vacuum valve of a second embodiment according to the present invention, showing a valve closed state.
Figure 9B:
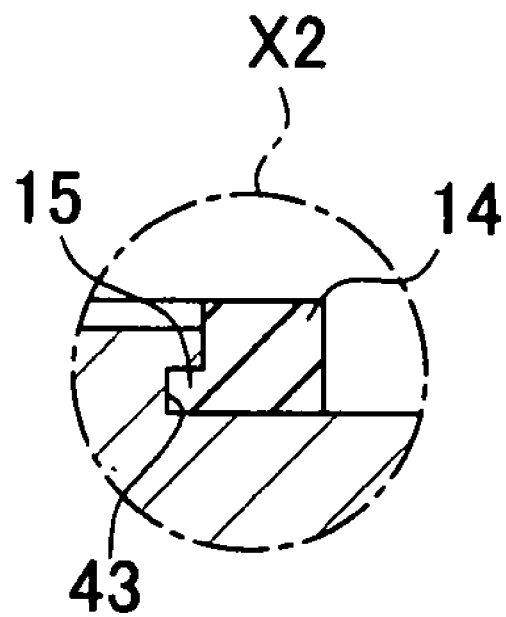
FIG. 9B is an enlarged view of a part X2 in FIG. 9A.
Figure 10:
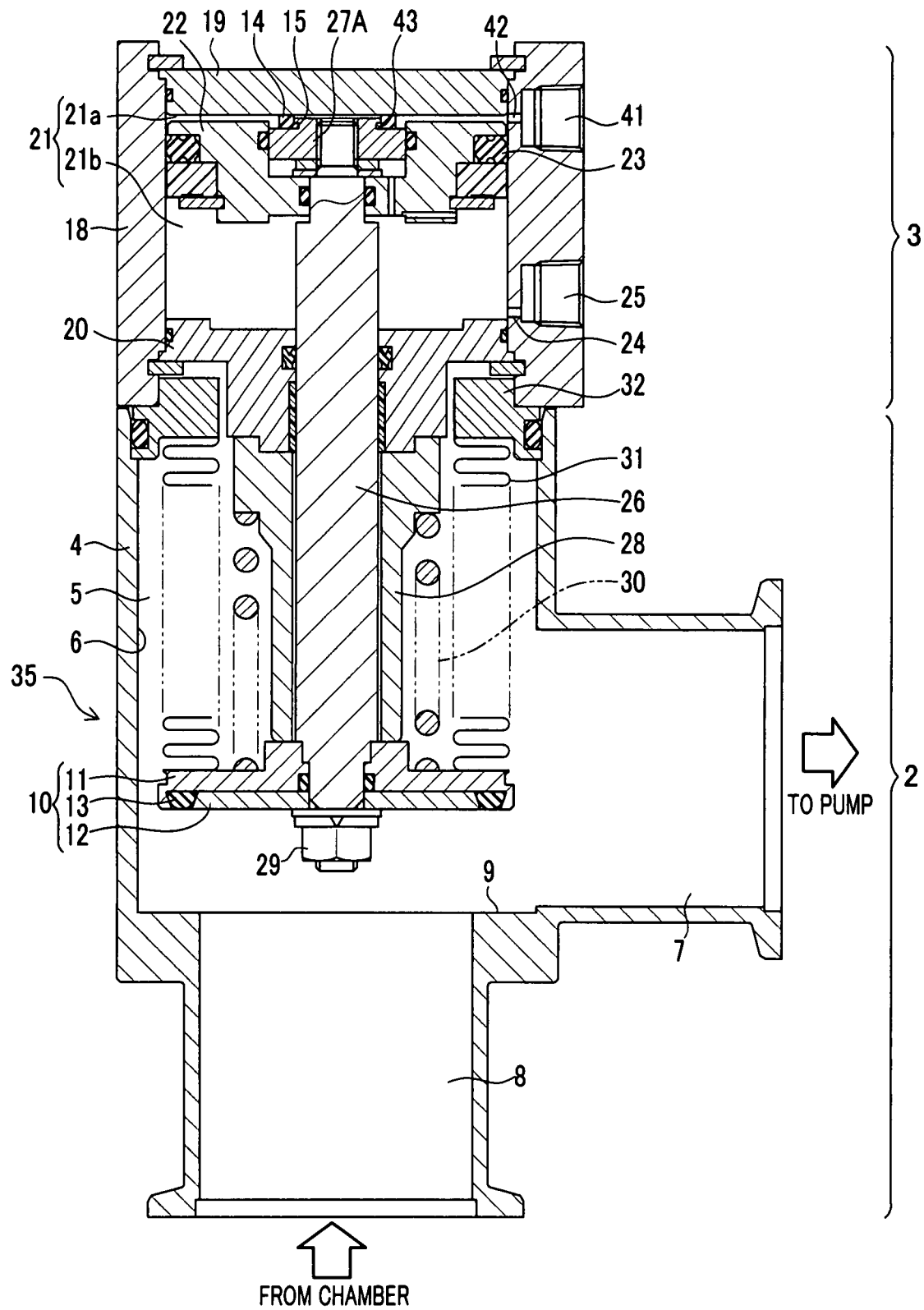
FIG. 10 is a sectional view of the vacuum valve of the second embodiment, showing a valve open state.

Next, a vacuum valve of a second embodiment according to the present invention will be described referring to accompanying drawings. FIG. 9A is a sectional view of a vacuum valve 1A of the second embodiment, showing a valve closed state. FIG. 9B is an enlarged view of a part X2 in FIG. 9A. FIG. 10 is a sectional view of the vacuum valve 1A of the second embodiment, showing a full open state.

The vacuum valve 1A of the second embodiment differs from that of the first embodiment in that the cushioning member 14 is provided in the actuator section 3 instead of the valve section 2 to constitute the "cushioning mechanism". The vacuum valve 1A of the second embodiment is also different from that of the first embodiment in that an discharge port 41 is formed in the cylinder body 18 in addition to the operation port 25. The second embodiment will be explained with a focus on the differences from the first embodiment, and similar components are given the same reference numerals without being repeatedly explained herein.

In the vacuum valve 1A, as shown in FIGS. 9A, 9B, and 10, the cushioning member 14 is fitted on a fixing nut 27A so that the cushioning member 14 protrudes upward relative to the upper end of the output shaft 26, the upper end of the nut 27A, and the upper surface of the piston 22. The nut 27A is formed with a shoulder for attachment of the cushioning member 14 and a recess 43 radially inwardly recessed on the periphery of the shoulder. In the recess 43, the annular protrusion 15 of the cushioning member 14 is engaged. Specifically, the cushioning member 14 is fitted on the nut 27A in such a way that the protrusion 15 is engaged in the recess 43 to prevent the cushioning member 14 from dropping off the nut 27A.

The vacuum valve 1A is provided with a discharge orifice 42 through which the first chamber 21a is communicated with the discharge port 41. This discharge port 41 can be connected to a discharge control device not shown for controlling a discharge speed.

The vacuum valve 1A having the above configuration is operated in the following manner. When an operating fluid (air) is supplied to the vacuum valve 1A through the operation port 25, increasing the internal pressure of the second chamber 21b, the piston 22 is moved upward against the spring force of the return spring 30, compressing the air in the first chamber 21a, thus causing the air to be discharged from the first chamber 21a through the discharge port 41. The valve element 10 coupled to the piston 22 is accordingly moved upward away from the valve seat 9 to allow communication between the first port 7 and the second port 8. A fluid is therefore allowed to flow from the vacuum container to the vacuum pump. At that time, the orifice 24 serves to regulate the flow rate of the operating fluid to be supplied to the second chamber 21b to control the operating speed of the piston 22 and the valve element 10. In addition, the discharge orifice 42 serves to regulate the flow rate of air to be discharged from the first chamber 21a to compress the air filled in the first chamber 21a, thereby exerting an air cushion effect. This makes it possible to prevent the output shaft 26, the nut 27A, and the piston 22 from rapidly moving, leading to collision with the first closing plate 19.

As shown in FIG. 10, the vacuum valve 1A is fully open while the cushioning member 14 abuts against the first closing plate 19. When collides with the first closing plate 19, the cushioning member 14 absorbs the impact of collision by its own elasticity and further holds the nut 27A, the output shaft 26, and the piston 22 closely spaced from the first closing plate 19. Accordingly, the nut 27A, the output shaft 26, and the piston 22 which are made of metal can be prevented from directly colliding with the metal first closing plate 19. Thus, the impact of such a collision will not be transmitted to the bellows 31 through the cylinder body 18, the holder 32, and others.

According to the vacuum valve 1A of the second embodiment, the impact caused when the output shaft 26, the nut 27A, or the piston 22 is brought into contact with the first closing plate 19 can be reduced and thus the impact acceleration can be decreased. Accordingly, the vibration generated in the bellows 31 can be reduced, achieving an increased life of the bellows 31 and the improved endurance of the vacuum valve 1A.

The operating speed of the valve element 10 is controlled to a predetermined speed through the use of the orifice 24. Further, the valve element 10 is allowed to abut against the pipe member 28 while the impact acceleration is reduced by the cushioning member 14. Consequently, the valve element 10 can receive only a small shock when it abuts against the pipe member 28.

When supply of the operating fluid is stopped, on the other hand, the valve element 10 is pushed down by the spring force of the return spring 30. The spring force of the return spring 30 is transmitted to the piston 22 through the output shaft 26. At that time, the discharge orifice 42 functions to control the speed of air to be supplied from the discharge port 41 to the first chamber 21a. Thus, the piston 22 will not be moved down rapidly. Consequently, the piston 22 and the valve element 10 can be moved down slowly, so that the impact acceleration of the valve element 10 when it comes into contact with the valve seat 9 is small.

The vacuum valve 1A of the second embodiment can control the operating speed through the use of the discharge orifice 42 at the time of valve closing as well as the operating speed at the time of valve opening. Accordingly, the impact acting on the bellows 31 can be mitigated, leading to an increased life of the bellows 31 and the improved endurance of the vacuum valve 1A.

It is to be noted that the operating speed at the time of the valve closing is controlled by the effective sectional area of the discharge orifice 42. In other words, the effective sectional area of the discharge orifice 42 is determined by the aforementioned expressions I and II in the same manner as to determine the effective sectional area of the orifice 24 so that the operating speed of the valve element 10 or the piston 22 at the valve closing time is set in an operating speed range effective in preventing damage of the bellows 31. Consequently, in addition to the valve opening time, the operating speed at the valve closing time can be controlled to prevent the damage of the bellows 31, thus achieving a further increased life of the bellows 31.

Third Embodiment

Figure 11A:
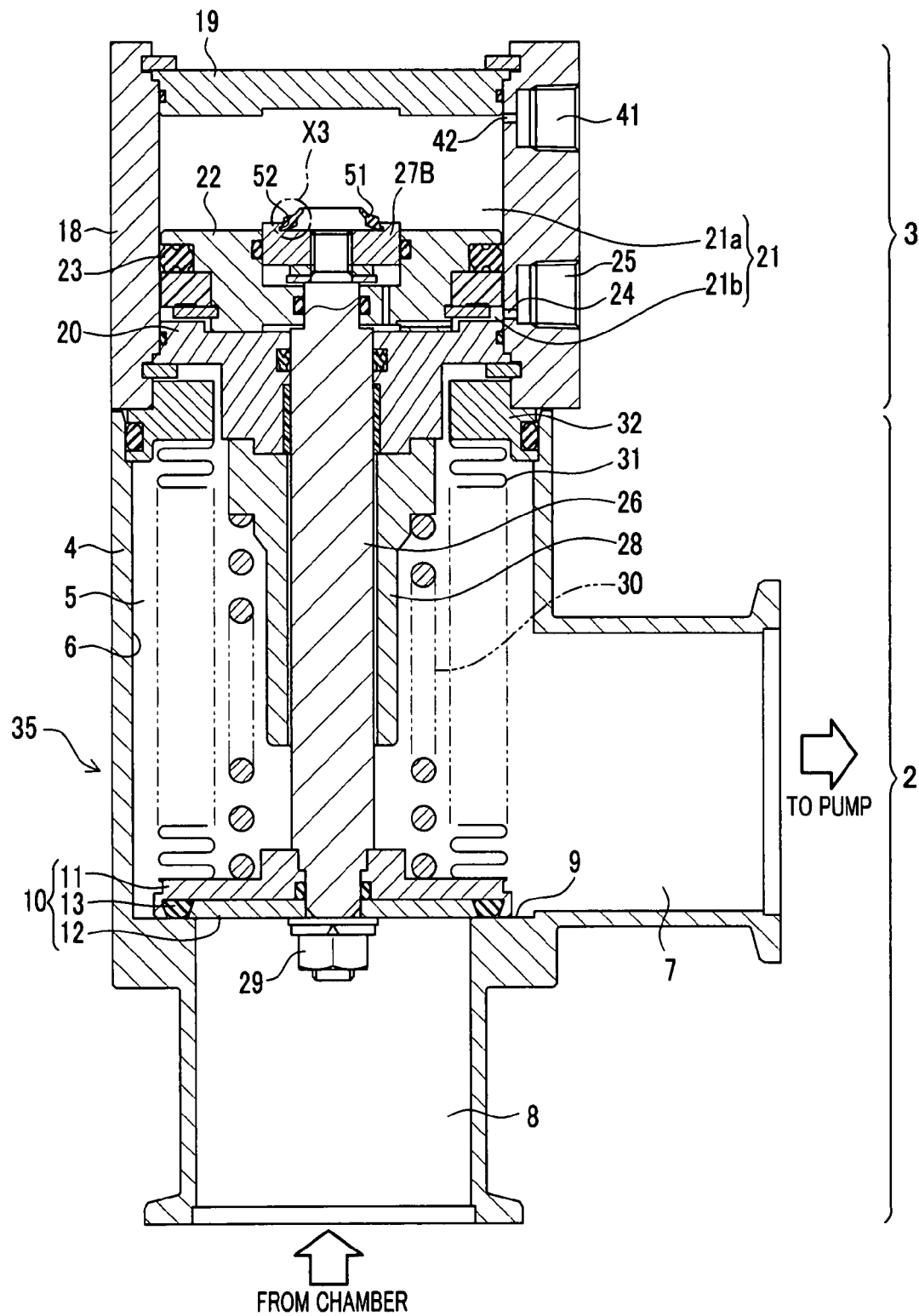
FIG. 11A is a sectional view of a vacuum valve of a third embodiment according to the present invention, showing a valve closed state.
Figure 11B:
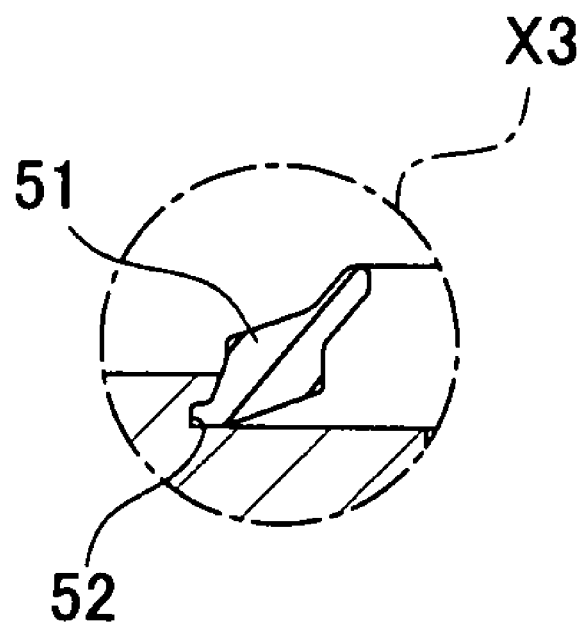
FIG. 11B is an enlarged view of a part X3 in FIG. 11A.
Figure 12:
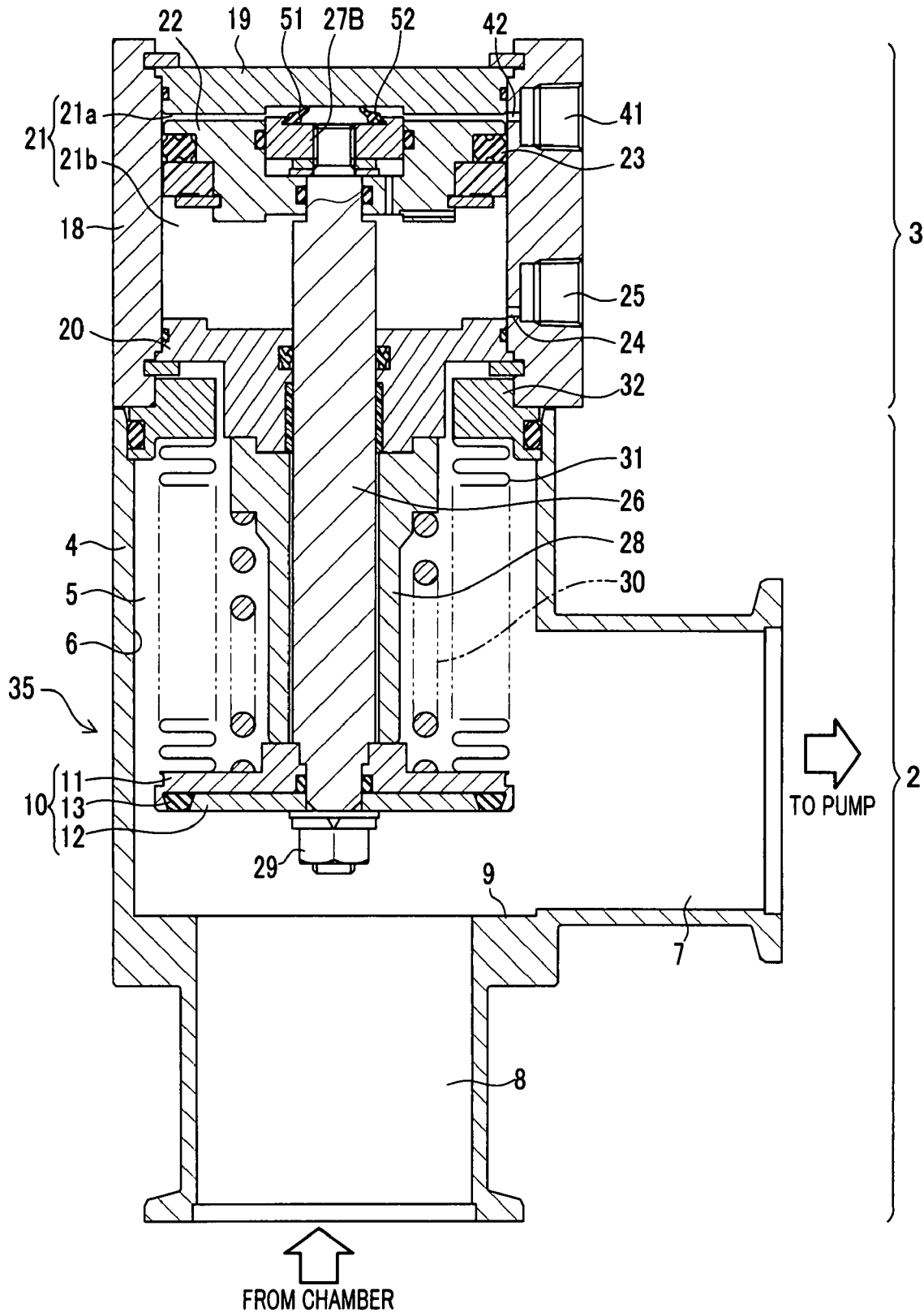
FIG. 12 is a sectional view of a vacuum valve of a third embodiment according to the present invention, showing a valve open state.

Next, a vacuum valve of a third embodiment according to the present invention will be described referring to accompanying drawings. FIG. 11A is a sectional view of a vacuum valve 1B of the third embodiment, showing a valve closed state. FIG. 11B is an enlarged view of a part X3 in FIG. 11A. FIG. 12 is a sectional view of the vacuum valve 1B of the third embodiment, showing a valve open state.

The vacuum valve 1B of the third embodiment is identical to that of the second embodiment excepting that a rubber air cushion 51 which is an example of the "cushioning mechanism" is attached to a fixing nut 27B. The following explanation is therefore made with a focus on the difference from the second embodiment. Similar components to those in the second embodiment are given the same reference numerals without being repeatedly explained herein.

The vacuum valve 1B of the third embodiment is arranged to mitigate the impact at the valve opening time by elastically deforming the rubber air cushion 51. This rubber air cushion 51 is made of rubber such as fluorocarbon rubber hard to plastically deform. The rubber air cushion 51 is formed in an annular tapered shape having an upper opening smaller in diameter than a lower opening in the figure. The rubber air cushion 51 is designed to have a thickness decreasing from the axially center portion toward the upper opening and the lower opening respectively to allow easy deformation in the axial direction. Such rubber air cushion 51 is attached to the nut 27B in such a way that the lower end is engaged in a groove 52 formed in the nut 27B coaxially with the output shaft 26B. Thus, the rubber air cushion 51 can be prevented from dropping off the nut 27B.

In the above vacuum valve 1B, when the piston 22 is moved upward against the spring force of the return spring 30, the upper end of the rubber air cushion 51 comes into close contact with the first closing plate 19, thus hermetically sealing air between the first closing plate 19 and the nut 27B. When the piston 22 is further moved upward, the sealed air is compressed to exert an elastic force. This makes it possible to prevent the output shaft 26, the nut 27B, and the piston 22 from colliding with the first closing plate 19 or to minimize the impact of the collision even if it occurs. Accordingly, the impact of valve element 10 when abutting against the pipe member 28 can be reduced.

Consequently, the vacuum valve 1B of the third embodiment is arranged such that the rubber air cushion 51 can reduce the impact of the output shaft 26, the nut 27, or the piston 22 with the first closing plate 19 and the impact acceleration of the valve element 10 when abutting against the pipe member 28, so that the vibration to be transmitted to the bellows 31 can be reduced. The bellows 31 is therefore unlikely to be cracked or broken due to stress concentration at a fixed portion. As a result, the life of the bellows 31 can be increased and hence the endurance of the vacuum valve 1B can be improved.

Fourth Embodiment

Figure 13A:
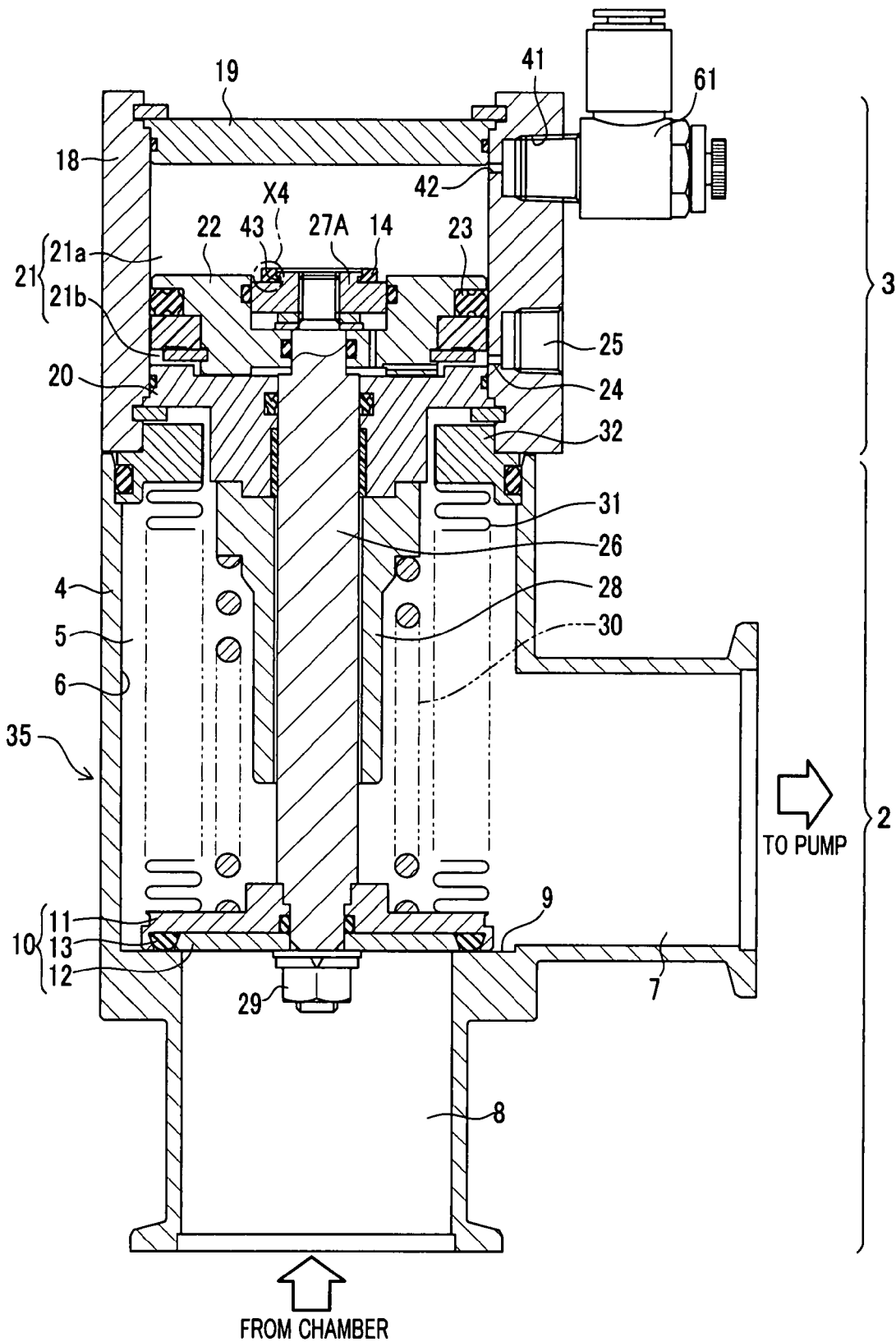
Figure 13B:
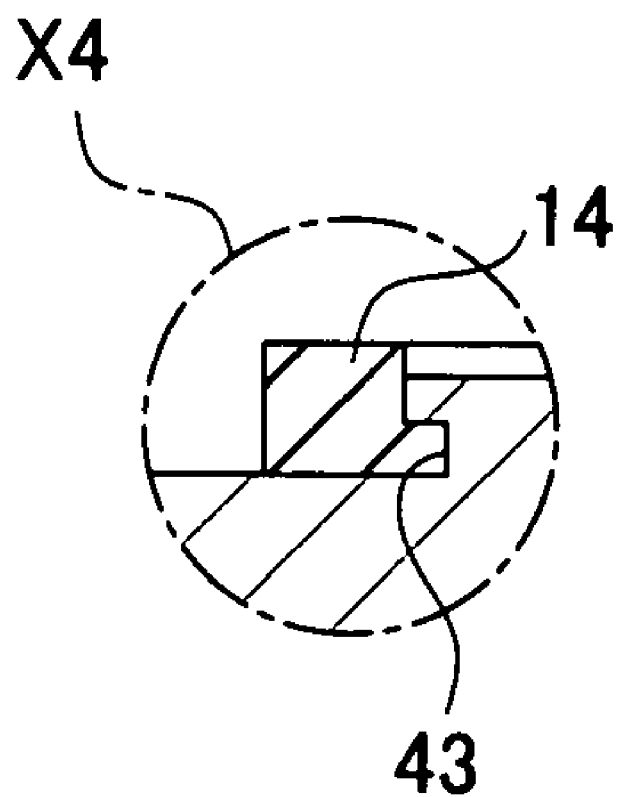
FIG. 13B is an enlarged view of a part X4 in FIG. 13A.

Next, a vacuum valve of a fourth embodiment according to the present invention will be described referring to accompanying drawings. FIG. 13A is a sectional view of a vacuum valve 1C of the fourth embodiment, showing a valve closed state. FIG. 13B is an enlarged view of a part X4 in FIG. 13A.

The vacuum valve 1C of the fourth embodiment is identical to that of the second embodiment excepting that a speed controller 61 which is an example of the "cushioning mechanism" is attached to the discharge port 41. The following explanation is therefore made with a focus on the difference from the second embodiment. Similar components to those in the second embodiment are given the same reference numerals without being repeatedly explained herein.

The vacuum valve 1C of the fourth embodiment is arranged to perform the control of a discharge speed for discharging air from the first chamber 21a by use of the speed controller 61 in addition to the control of a flow rate of air to be discharged from the first chamber 21a through the discharge orifice 42. Compared with the vacuum valve 1A of the second embodiment, therefore, the vacuum valve 1C can accurately control the speed of the piston 22 when it starts to move and the acceleration of the piston 22 when it moves upward. As a result, the operating speed can be controlled to a predetermined speed more precisely.

Fifth Embodiment

Figure 14:
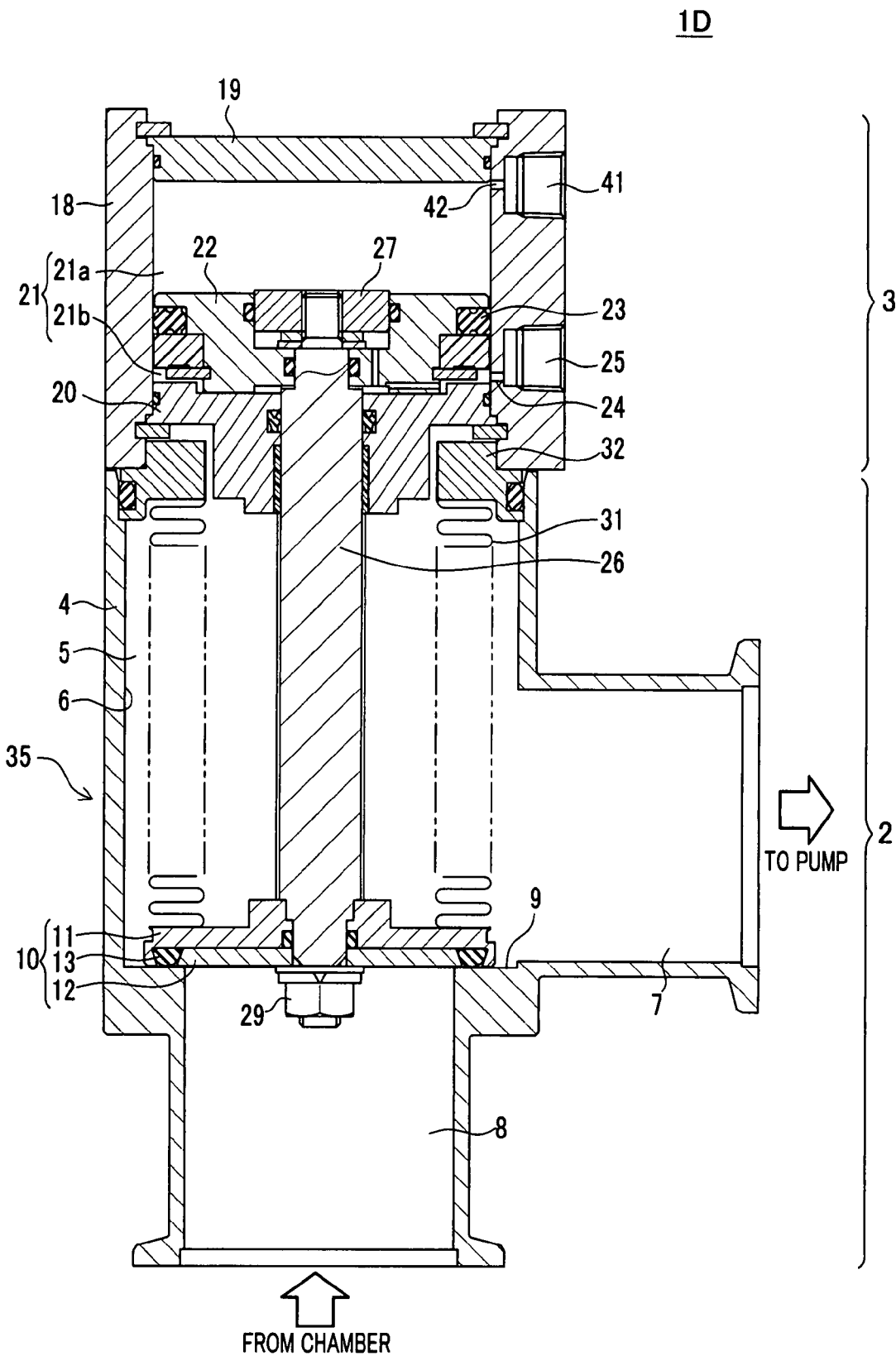
FIG. 14 is a sectional view of a vacuum valve of a fifth embodiment according to the present invention, showing a valve closed state.
Figure 15:
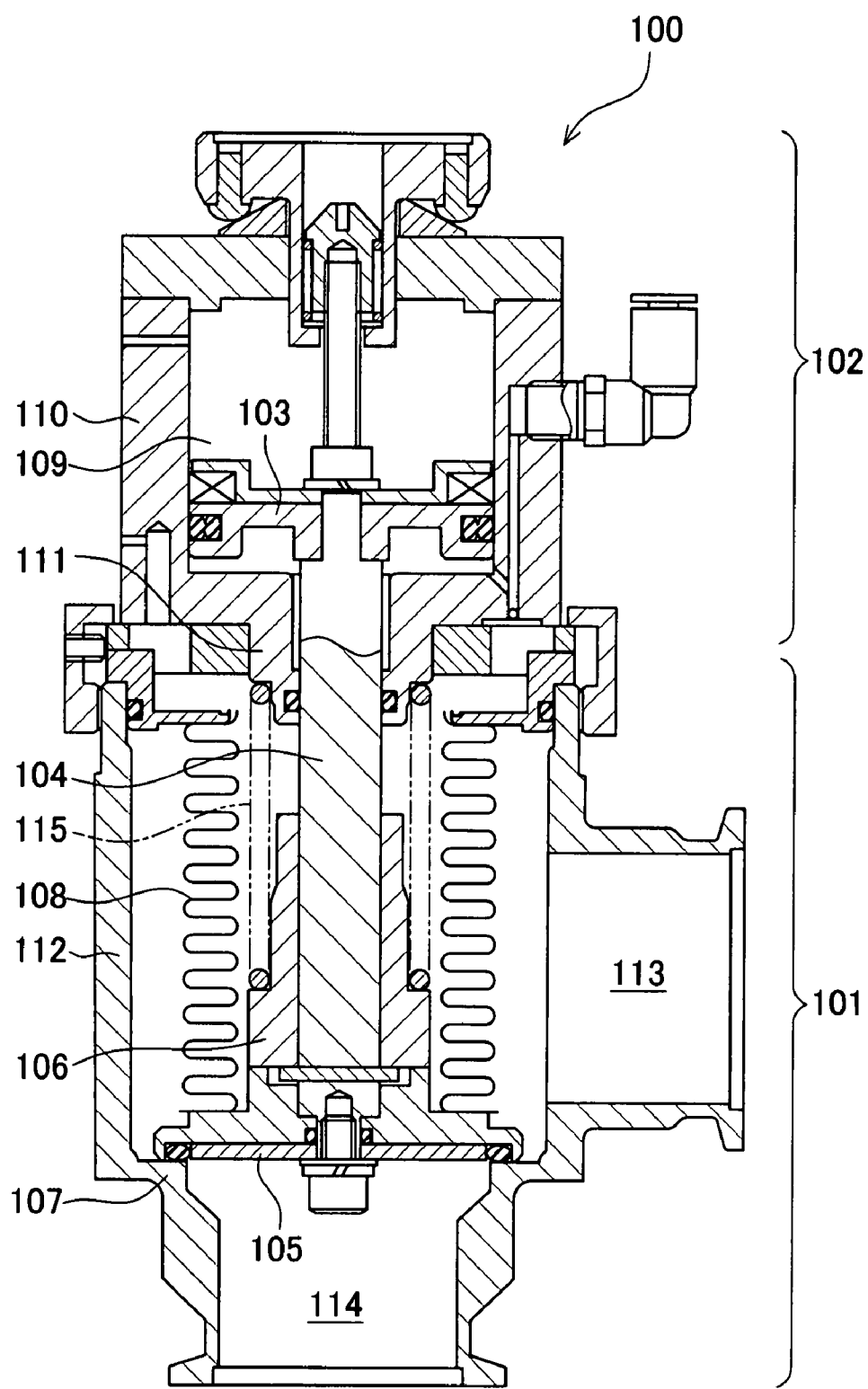
FIG. 15 is a sectional view of a vacuum valve in a prior art.

Next, a vacuum valve of a fifth embodiment according to the present invention will be described referring to accompanying drawing. FIG. 14 is a sectional view of a vacuum valve 1D of the fifth embodiment, showing a valve closed state.

The vacuum valve 1D of the fifth embodiment is identical to that of the second embodiment excepting that the vacuum valve 1D does not include the pipe member 28 and the return spring 30 and the cushioning member 14. The following explanation is therefore made with a focus on the differences. Similar components to those in the second embodiment are given the same reference numerals without being repeatedly explained herein.

The vacuum valve 1D of the fifth embodiment is arranged such that the operation port 25 can be connected to an operating fluid supply source not shown and the discharge port 41 can be connected to the operating fluid supply source not shown which is an example of the "cushioning mechanism" to control the balance between the internal pressure of the first chamber 21a and the internal pressure of the second chamber 21b to move the piston 22, thereby performing the valve opening and closing operations. The vacuum valve 1D is operated to close in such a way that an operating fluid is supplied to the first chamber 21a through the discharge port 41 to increase the internal pressure of the first chamber 21a while an operating fluid is discharged from the second chamber 21b through the operation port 25 to decrease the internal pressure of the second chamber 21b, thereby moving the piston 22 downward to close the valve. Thus, the vacuum valve 1D does not include the compression spring 30 accordingly.

The vacuum valve 1D is arranged to open by air pressurization as above. Thus, the output shaft 26 is moved vertically upward and downward in the axial direction with stability. Further, the stop positions of the piston 22 and the valve element 10 can be accurately controlled by the air pressure. The vacuum valve 1D therefore does not have to include the pipe member 28.

In the vacuum valve 1D of the fifth embodiment, the internal pressures of the first chamber 21a and the second chamber 21b are regulated by use of the operating fluid control device not shown connected to the operation port 25 and the discharge port 41 respectively. When the vacuum valve 1D is to be opened, accordingly, the flow rate of air to be discharged from the first chamber 21a is regulated by the discharge orifice 42 and additionally the discharge pressure of the air to be discharged through the discharge port 41 is controlled by the operating fluid control device. Accordingly, when the operating fluid is supplied to the operation port 25, thereby pressurizing the piston 22 upward in the figure, the air in the first chamber 21a is compressed to serve as a cushion whereby preventing the piston 22 from rapidly moving upward. Consequently, the operating speed of the piston 22 is made slower, preventing rapid movement of the piston 22. This makes it possible to prevent the piston 22 from causing strong collision of the output shaft 26, the nut 27, and others with the first closing plate 19.

In the vacuum valve 1D of the fifth embodiment, consequently, the control of air pressure allows the piston 22 to stop just before the output shaft 26, the nut 27, and the piston 22 come into contact with the first closing plate 19. Even when the output shaft 26, the nut 27, and the piston 22 come into contact with the first closing plate 19, the impact of contact can be minimized owing to the air cushioning effect of the operating fluid filled in the first chamber 21a. According to the vacuum valve 1D of the fifth embodiment, it is possible to minimize the impact caused when the output shaft 26, the nut 27, and the piston 22 are stopped in contact with the first closing plate 19 forming the inner wall of the piston chamber 21. Thus, the vibration generated in the bellows 31 can be reduced, leading to an increased life of the bellows 31 and the improved endurance of the vacuum valve 1D.

The present invention is not limited to the above embodiments and may be embodied in other specific forms without departing from the essential characteristics thereof.

(1) For instance, although the fluid is allowed to flow from the second port 8 to the first port 7 in the above embodiments, the fluid is allowed to reversely flow from the first port 7 to the second port 8.

(2) In the above embodiment, the effective sectional area of the orifice 24 is utilized to ensure an appropriate operating speed and the cushioning member 14 or the rubber air cushion 51 is utilized to ensure appropriate impact acceleration. As an alternative, it may be arranged such that either one of the effective sectional area of the orifice 24 and the cushioning member 14, 51 is utilized to obtain only an appropriate operating speed or only impact acceleration to increase the life of the bellows 31.

(3) The vacuum valve 1 of the first embodiment, instead of using the cushioning member 14, may use an appropriate one capable of reducing the impact by its own elasticity such as the rubber air cushion 51 (see FIGS. 11A, 11B, and 12), a plate spring, and a coil spring.

(4) The vacuum valve 1A of the second embodiment, instead of using the cushioning member 14, may use an appropriate one capable of reducing the impact by its own elasticity such as a plate spring and a coil spring.

(5) In the first through fourth embodiments, the cushioning member 14 or the air cushion 51 is attached to the valve element 10 or the nut 27A, 27B. Alternatively, the cushioning member 14 or the rubber air cushion 51 may be attached to the lower end of the pipe 28 or the first closing plate 19 to reduce the impact caused between the valve element 10 and the pipe member 28 and reduce the impact caused by the output shaft 26, the nut 27A, 27B, or the piston 22 against the first closing plate 19.

(6) In the vacuum valve 1D of the fifth embodiment, the cushioning member 14 or the rubber air cushion 51 may be attached to the fixed plate 11 and the nut 27.

(7) Although the orifice 24 in the above embodiments has a circular section, it may have any shape in section if only it has a predetermined effective sectional area, such as ellipse, flower-shape, triangle, and square.

(8) In the first embodiment, the full open position of the valve element 10 is determined when the valve element 10 abuts against the pipe member 28 formed as a part of the valve main unit 35. As an alternative, the valve element 10 may be provided with a pipe part through which the output shaft 26 is inserted as in the prior art so that the full open position is determined when the pipe part of the valve element 10 side abuts against the second closing plate 20 formed as a part of the valve main unit 35. In this case, the cushioning member 14 may be attached to the upper end of the pipe part or to a portion of the second closing plate 20 corresponding to the pipe part.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A vacuum valve comprising:

a valve section including a first port, a second port, a valve seat provided between the first and second ports, and a valve element movable into or out of contact with the valve seat;

an actuator section including an orifice through which an operating fluid is supplied to the actuator section, and a piston coupled to the valve element, the piston being allowed to operate according to changes of pressure of the operating fluid to apply a driving force to the valve section; and a bellows which can be contracted and elongated as the valve element vertically moves upward and downward, wherein the orifice is designed to have an effective sectional area determined so that an operating speed of the valve element and the piston is controlled to a predetermined speed for preventing damage of the bellows, the operating speed V is determined by an expression V=L/t where L indicates an operation stroke of the piston, and t indicates an operation time for an operation stroke of the piston, and the effective sectional area of the orifice is determined by the following expression:

$$t2 = 0.005536 \times \frac{\left[\frac{M}{P_0}\right]^{0.415}}{A_1^{0.245}\left[1 - \frac{F+f}{A_1 P_0}\right]} \times \frac{L^{0.585}}{S_2^{0.17}}$$

where F indicates a load (N), f indicates a frictional force (N) of a cylinder body, $A_1$ indicates a pressure-receiving area (mm$^2$) of part of the piston on a fluid supply side, $P_0$ indicates pressure (MPa) of the operating fluid to be supplied to an operation port, M indicates a mass (kg) of the load, and $S_2$ indicates an effective sectional area of the orifice on the side of the operation port.

2. The vacuum valve according to claim 1, further comprising:

a cushioning member adapted to mitigate impact caused when the valve element is moved into contact with a valve main unit and also reduce impact acceleration of the valve element when it is moved into contact with the valve main unit to prevent damage of the bellows.

* * * * *